United States Patent [19]

Matubara et al.

[11] 4,081,415
[45] Mar. 28, 1978

[54] HOT MELT ADHESIVE COMPOSITION

[75] Inventors: Saburo Matubara, Yokohama; Sakuya Iwai, Tokyo, both of Japan

[73] Assignee: Nippon Oil Company Ltd., Japan

[21] Appl. No.: 730,209

[22] Filed: Oct. 6, 1976

[30] Foreign Application Priority Data

Oct. 9, 1975 Japan .................. 50-121336

[51] Int. Cl.$^2$ .............................. C08L 91/00
[52] U.S. Cl. ................ 260/28.5 AV; 260/897 B; 260/889
[58] Field of Search ............ 260/28.5 AV, 897 B, 260/889

[56] References Cited

U.S. PATENT DOCUMENTS

| 3,023,200 | 2/1962 | Epstein et al. ............ 526/283 |
| 3,565,843 | 2/1971 | Kassinger et al. ........ 260/28.5 AV |
| 3,745,054 | 7/1973 | Smedberg ................ 260/28.5 AV |
| 3,778,421 | 12/1973 | Hayashi et al. ........... 526/290 |

FOREIGN PATENT DOCUMENTS 531,202 10/1956 Canada.

Primary Examiner—Melvyn I. Marquis
Attorney, Agent, or Firm—Robert E. Burns; Emmanuel J. Lobato; Bruce L. Adams

[57] ABSTRACT

A hot melt adhesive composition is disclosed, which is highly adhesive and thermally stable. The composition includes a tackifying resin which is an aromatic hydrocarbon resin resulting from the polymerization of a thermally cracked petroleum fraction boiling in the range of 140° –220° C in the presence of a Friedel-Crafts catalyst. The resin is blended with ethylene copolymers and various waxes to form a hot melt adhesive compound.

6 Claims, No Drawings

HOT MELT ADHESIVE COMPOSITION

BACKGROUND OF THE INVENTION

This invention relates to resinous compositions, more particularly to hot melt compositions suitable in coating and adhesive applications.

There have been proposed numerous adhesive compositions and particularly, hot melt adhesive compositions of 100 percent solid type which have found extensive application in book bindings, packaging, woodcrafts and the like for their excellent fireproofness, reduced curing time and ease of handling. Hot melt adhesive compositions are solid at room temperature and melt with heat so that they may be coated in molten condition onto a desired substrate such as cloth and paper and cooled to cure thereon. Amongst the important properties required in order that the adhesive compositions exhibit good and uniform adhesiveness with respect to different substrates, there should always be considered the question of whether they have sufficient resistance to heat or thermal stability particularly at low temperature.

Conventional hot melt adhesive compositions usually comprise, as a base polymer, an ethylene copolymer such as ethylene-vinyl acetate copolymer (EVA) and ethylene-acrylate copolymer, or a thermoplastic material such as polyethylene, thermoplastic rubber, polyamide, polyurethane, polyester, the base polymer being blended with a tackifying resin, a viscosity regulator and waxes to improve adhesiveness and melt viscosity. Of the above listed examples of base polymer, wider use has been made of EVA and ethylene-acrylate for their low cost, excellent yieldability, and high thermal stability. The tackifying resin has been preferably a naturally occurring resin such as rosin and terpene resin, the former being highly adhesive and pliable or flexible at low temperature, and the latter being thermally stable. However, since these resins originate from limited natural resources, they are objectionably costly. Attempts have been made to explore the possibility of petroleum resins comparable in adhesiveness, thermal stability, and low temperature characteristics to rosin and terpene resin, but with no satisfactory success to date.

SUMMARY OF THE INVENTION

It is therefore a primary object of this invention to provide a hot melt adhesive composition which is less costly and universally applicable.

A more specific object of the invention is the provision of an improved hot melt adhesive composition which includes a tackifier made of a petroleum resin of a character which is comparable or even superior to naturally occurring resins.

These objects or features of the invention can be attained by the preparation of a hot melt composition essensially comprising an ethylene copolymer, a tackifier and a wax, said tackifier being a thermally-cracked petroleum fraction which has a boiling point in the range of 140° – 220° C and in which the content of conjugated diolefin is 0.7 weight percent or less, the ratio of conjugated diolefin content to the polymerizable component (defined below) is 3 percent or less, the total content of indene and its alkyl derivatives is 2 weight percent or less, and the rate of indene content to the polymerizable component is 8 percent or less, and the whole being subjected to polymerization at a temperature ranging from −30° C to +60° C in the presence of a Friedel-Crafts catalyst added in amounts of 0.01 – 5 weight percent based on the starting fraction. The resulting reaction product is characterized by being an aromatic hydrocarbon resin.

The invention will be better understood from the following detailed description.

DETAILED DESCRIPTION OF THE PREFERRED EMBODIMENTS

The ethylene copolymer contemplated in accordance with the invention is a copolymer of ethylene and monocarboxylic acid vinylester and/or acrylic acid ester. The content of this copolymer is an ultimate adhesive composition is in the range of 10 – 60 weight percent, preferably 15 – 45 weight percent. Its melt index is in the range of 0.1 – 1,000, preferably 1 – 500 as measured by the ASTM Procedure D-1238.

The tackifying resin according to the invention is an aromatic hydrocarbon resin obtained from the polymerization of a thermally cracked petroleum fraction having a boiling point in the range of 140° – 220° C.

Generally, the so-called petroleum hydrocarbon resin is prepared by the polymerization of normally liquid, oil fractions resulting from the thermal cracking of petroleum oils, such fractions usually boiling at a wide temperature range, say from 20° to 280° C, from 20° to 170° C, or from 140° to 280° C. The use of starting feed oils boiling at temperatures ranging widely from 20° to 140° C would result in a non-aromatic hydrocarbon resin which contains large amounts of conjugated and non-conjugated diolefins, and hence is highly unsaturated, objectionably colored and thermally unstable. Feed oils having a boiling point in the range of 140° – 280° C may produce an aromatic hydrocarbon resin; however, such resin is not satisfactory in respect of thermal stability and color and when used for a hot melt adhesive compound, cannot contribute to adhesiveness.

The starting material for the tackifying resin under contemplation is available from byproducts resulting from the pyrolysis or steam cracking of naphtha, kerosine or light oil fractions into ethylene, propylene, butanes and butadienes. From such byproducts, a specific fraction is selected which has a boiling point in the range of 140° – 220° C and contains substantially, as unsaturated components, styrene and its derivatives and indene and its derivatives. This starting material is further fractionated so as to adjust the content of conjugated diolefin to be 0.7 weight percent or less, the ratio of conjugated diolefin content to the polymerizable component to be 3 percent or less, the total content of indene and its alkyl derivatives to be 2 weight percent or less, and the ratio of indene content to the polymerizable component to be 8 percent or less. The thus adjusted fraction is polymerized in the presence of a Friedel-Crafts catalyst, followed by the removal of this catalyst and then all unreacted fractions and low molecular polymers by evaporation or distillation. The resulting product is an aromatic hydrocarbon resin.

A gas chromatographic analysis of all components in the petroleum fraction boiling in the range of 140° – 220° C is shown in Table 1 below.

Table 1

| Petroleum Fraction Boiling 140° – 220° C | | |
|---|---|---|
| Components | Boiling point, ° C. (760 mm. Hg abs) | Content (wt. percent) |
| Styrene | 145.8 | 13–20 |

Table 1-continued
Petroleum Fraction Boiling 140° – 220° C

| Components | Boiling point, °C. (760 mm. Hg abs) | Content (wt. percent) |
|---|---|---|
| Allybenzene | 156–157 | 0.1–1 |
| α-Methylstyrene | 165.4 | 0.5–6 |
| β-Methylstyrene | 175 | 0.5–6 |
| p-Vinyltoluene | 168 | |
| m-Vinyltoluene | 169 | 10–20 |
| o-Vinyltoluene | 171 | |
| Indene | 182.2 | 2–11 |
| Methylindene homologs | 184–206 | |
| Dimethylindene and ethylindene homologs | ≮212 | 1–3 |
| Xylene (o-, m-, and p-isomers) | 138–142 | |
| Ethylbenzene | 136.2 | 17–10 |
| Isopropylbenzene | 152.5 | |
| Ethyltoluene (o-, m-, and p-isomers) | 158–164.6 | 18–7 |
| n-Propylbenzene | 159.6 | 1–0.1 |
| Trimethylbenzene (1,3,5-, 1,2,4-, and 1,2,3,-isomers) | 164.6–176.5 | 25–6 |
| Indane | 177 | 9–1 |
| Methylindanehomologs | 182–203 | |
| Dimethyl and ethylindane homologs | ≮200 | 2–0.5 |
| Naphthalene | 218 | |
| Dicyclopentadiene[1] | 170 | 0.2–3 |
| Undetected component[2] | 140–220 | 0.7–5.4 |

[1] A part or whole of dicyclopentadiene may be sometimes depolymerized with heat into cyclopentadiene.

[2] A part of the undetected component contains cyclopentadiene-methylcyclopentadiene co-dimer and methylcyclopentadiene dimer. A part or whole thereof is sometimes depolymerized with heat into cyclopentadiene and methycyclopentadiene. These monomers are analyzable by gas chromatography.

In the above-mentioned components, the total of styrene and its derivatives, indene and its derivatives is considered as the polymerizable component. In case cyclopentadiene and methylcyclopentadiene are produced by heating and contained in the feed oil as above noted, these monomers are also considered as a part of the polymerizable component.

In order to attain the results contemplated by the invention, it is essential that a thermally cracked petroleum oil boiling in the range of 140° – 220° C, hereinafter referred to as a starting feed oil, be precisely fractionated and regulated to produce a specific fraction, hereinafter referred to as a feed oil, which will satisfy the following conditions:

(a) The total content of cyclopentadiene and methylcyclopentadiene, i.e., the content of conjugated diolefin in the feed oil separated from the starting feed oil is 0.7 weight percent or less, and the ratio of conjugated diolefin content to the polymerizable component defined in the following equation (1), is 3 percent or less.

$$\text{Ratio of Conjugated Diolefin Content (percent)} = \frac{\text{conjugated diolefin content}^{1)} \text{ in feed oil (wt. percent)}}{\text{polymerizable component in feed oil (wt. percent)}} \times 100 \quad (1)$$

[1] Designates the total content of cyclopentadiene and methylcyclopentadiene.

(b) The total content of indene and its alkyl derivatives in the feed oil is 2 weight percent or less, and the ratio of indene content to the polymerizable component, as defined in the following equation (2), is 8 percent or less.

$$\text{Ratio of Indene Content (percent)} = \frac{\text{content of indene and its alkyl derivative in feed oil (wt. percent)}}{\text{polymerizable component in feed oil (wt. percent)}} \times 100 \quad (2)$$

The starting feed oil and the feed oil have been analyzed for their respective components by gas chromatography under the following conditions:

(i) Styrene, allylbenzene, 1,3,5-trimethylbenzene and o-ethyltoluene are analyzed at 100° C with a flow rate of helium set at 60 c.c. per minute, employing a 3 meter long column filled with "Celite" (manufactured by Johns-Manville Corp.) containing 20 percent by weight of "Apiezon L" grease (manufactured by Associated Electrical Industries Ltd.)

(ii) The remaining components are analyzed at 125° C with a helium flow of 60 c.c. per minute through a 3 meter long column filled with 20 weight percent "Celite" containing polyethylene 4,000.

The total content of styrene, its alkyl derivatives, indene, its alkyl derivatives, cyclopentadiene and methylcyclopentadiene thus analyzed is considered as the polymerizable component.

The method of preparing the tackifying resin employed in accordance with the invention is fully described and claimed in U.S. Pat. No. 3,778,421.

It has now been ascertained that no satisfactory results can be obtained with feed oils which depart from any one of the four parameters — 1) conjugated diolefin content 0.7 weight percent or less, 2) ratio of conjugated diolefin content to polymerizable component, 3 percent or less, 3) indene and its alkyl derivative content 2 weight percent or less, and 4) ratio of indene content to polymerizable component, 8 percent or less.

The class of waxes which may be blended to suit a particular application includes paraffin wax, microcrystalline wax, naturally occurring waxes, polyethylene wax, polypropylene wax, and atactic polypropylene wax.

The tackifying resin which forms an important part of the adhesive composition of the invention may be blended with ethylene copolymers and any of the above listed waxes over a relatively wide range of ratios. When the adhesive is to be applied to substrates such as paper, plastic film, aluminum foil and other packaging sheets, the rate of ethylene copolymer blends should be rather conservative. It may be applied by roll coating, gravure coating, dip coating or other types of coating (including impregnation). For these applications, the tackifying resin and the waxes may be blended in amounts of 20 – 300 parts and 10 – 400 parts by weight, respectively, per 100 parts by weight of ethylene copolymers, with satisfactory results. For use in woodcraft, book-binding or other applications where relatively high adhesiveness is required, the rate of ethylene copolymers should be increased. In which instance, for 100 weight parts of ethylene copolymers there may be used 20 – 200 weight parts of tackifying resin and 10 – 100 weight parts of waxes.

The following examples are offered to further illustrate the invention, but should not be regarded in a limiting sense.

EXAMPLE 1

A tackifying resin according to the invention was prepared from a starting feed oil available from the steam cracking of naphtha and boiling in the range of 140° – 220° C. The starting feed oil was gas chromatographed to reveal the following composition:

| Starting Feed Oil | |
|---|---|
| Polymerizable components (wt.%) | 49.0 |

-continued

| Starting Feed Oil | |
|---|---|
| Total content of cyclopentadiene and methylcyclopentadiene (wt.%) | 1.6 |
| Total content of indene and its alkyl derivatives (wt.%) | 8.4 |
| Content of dicyclopentadiene (wt.%) | 0.4 |
| Ratio of conjugated diolefin content (%) | 4.0 |
| Ratio of indene content to the polymerizable component (%) | 18.5 |

This thermally cracked oil fraction or starting feed oil F was charged via heater to a fractionator A-1 specified in Table 2 below.

Table 2

| Fractionator | A-1 | B-1 |
|---|---|---|
| Type of tray | Shieve | Bubble-Cap |
| Number of trays | 30 | 7 |
| Feed tray (from bottom) | 18 | 4 |
| Feed temperature (° C) | 108 | 55 |
| Bottom temperature (° C) | 145 | 120 |
| Bottom pressure (mm. Hg. abs.) | 120 | 110 |
| Top temperature (° C) | 93 | 25 |
| Top pressure (mm. Hg. abs.) | 68 | 95 |
| Reflux ratio | 5.0 | 2.0 |
| Residence time at bottom (hr.) | 1.0 | 0.5 |

The operating conditions of Fractionator A-1 were selected such that there was obtained from the overhead thereof a fraction in which the total content of indene and its alkyl derivatives was 2 weight percent or less and the ratio of indene content to the polymerizable component was 8 percent or less. This overhead product was charged to Fractionator B-1 operated under the above tabulated conditions, and there was obtained from the bottom thereof a feed oil in which the total content to the polymerizable component of cyclopentadiene and methylcyclopentadiene was 0.7 weight percent or less and the ratio of conjugated diolefin to the polymerizable component was 3 percent or less. Conjugated diolefins were removed from the top of Fractionator B-1. The resulting feed oil was 58 parts by weight as against 100 parts by weight of starting feed oil. The composition of the feed oil is identified in the following:

| Feed Oil Composition | |
|---|---|
| Polymerizable components (wt.%) | 42.60 |
| Total content of cyclopentadiene and methylcyclopentadiene (wt.%) | 0.40 |
| Total content of indene and its alkyl derivatives (wt.%) | 1.00 |
| Ratio of conjugated diolefin content to the polymerizable component | 0.84 |
| Ratio of indene content to the polymerizable component | 2.51 |

To the feed oil was added 0.5 weight percent of boron trifluoride phenol complex as catalyst, and polymerization was carried out for 3 hours at 20° C. The product was washed with aqueous solution of sodium hydroxide to remove the catalyst and washed with water. Unreacted oil and low polymer were removed from the product by distillation, thereby obtaining a weather-resistant resin. The softening point by the ring-and-ball method of the resin was 95° C. Its bromine value (by ASTM D-1158-57T) was 7, and its color by Gardner index (ASTM D-1544-58T) was 1⁻. 40 weight parts of this resin was blended with 40 weight parts of ethylene-vinyl acetate copolymer containing 28% of vinyl acetate and with 20 weight parts of paraffin wax having a melting point of 145° F, the whole being mixed at 180° C. There was obtained a hot melt or thermally fusible adhesive compound.

EXAMPLE 2

The procedure of Example 1 was followed except that the boron trifluoride phenol complex was 1.0 weight percent and the polymerization temperature was 40° C. The resulting tackifying resin had a softening point of 80° C, a bromine value of 14 and a color index of 1⁺. It was blended with the copolymer and wax in the manner described in Example 1.

EXAMPLE 3

The procedure of Example 1 was followed except that the polymerization temperature was 15° C. The resulting tackifying resin had a softening point of 105° C, a bromine value of 7 and a color index of 1⁻. Blending procedure was also the same as in Example 1.

EXAMPLES 4 – 11

The details of these examples are shown in Table 3.

COMPARING EXAMPLES 1 – 2

The starting feed oil F specified in Example 1 was polymerized under the same conditions as in Example 1 but in the absence of any tackifying resin. A different starting feed oil was also employed and polymerized under similar conditions except at a temperature 60° C. The resulting one resinous product F-1 had a softening point of 120° C, a bromine value of 18 and a color index of 4. The other resinous product F-2 had a softening point of 80° C, a bromine value of 25 and a color index of 5. These two products were blended with the copolymer and wax in the manner shown in Example 1, to produce respective adhesive compounds.

COMPARING EXAMPLES 3 – 7

The procedure of Example 1 was followed except for the various resins listed in Table 4. The details of each of these comparing examples are tabulated therein.

Table 3

| | Example | 1 | 2 | 3 | 4 | 5 | 6 | 7 | 8 | 9 | 10 | 11 |
|---|---|---|---|---|---|---|---|---|---|---|---|---|
| EVA | MI VA | | | | | | | | | | | |
| | #40 (55) (40) | | | | | | | | | | | 40 |
| | #150 (30) (33) | | | | 40 | | | | | 40 | 40 | |
| | #220 (150) (28) | 40 | 40 | 40 | | | 30 | 45 | 20 | | | |
| | #420 (150) (19) | | | | | 40 | | | | | | |
| Resin | | 40 | 40 | 40 | 40 | 40 | 50 | 45 | 20 | 40 | 40 | 40 |
| Wax | Paraffin wax (64° C) | 20 | 20 | 20 | 20 | 20 | 20 | 20 | 60 | | | 20 |
| | Microcrystalline wax (82.2° C) | | | | | | | | | 20 | | |
| | Low molecular weight polyethylene wax (91° C) | | | | | | | | | | 20 | |
| Softening point (° C) | | 73 | 68 | 75 | 70 | 80 | 67 | 71 | 66 | 81 | 91 | 68 |
| Adhesive | aluminum/aluminum | 1,900 | 2,200 | 1,500 | 3,250 | 1,200 | 950 | 2,150 | 50 | 5,000 | 4,250 | 4,050 |

Table 3-continued

| Example | 1 | 2 | 3 | 4 | 5 | 6 | 7 | 8 | 9 | 10 | 11 |
|---|---|---|---|---|---|---|---|---|---|---|---|
| Strength (g/25mm wide) polyester/polyester | 250 | 800 | 200 | 1,000 | 150 | 60 | 440 | 80 | 700 | 1,040 | 1,500 |
| Low Temperature Characteristics (−10° C) | not broken | not broken | not broken | broken | broken | broken | not broken | broken | not broken | not broken | not broken |
| Color Value | light yellow | light yellow | light yellow | light yellow | light yellow | light yellow | light yellow | light yellow | yellow | yellow | yellow |

Table 4

| Comparing Example | | 1 | 2 | 3 | 4 | 5 | 6 | 7 | Remarks |
|---|---|---|---|---|---|---|---|---|---|
| EVA | (MI) (VA) #220 (150) (28) | 40 | 40 | 40 | 40 | | | | |
| | F - 1 | 40 | | | | | | | |
| | F - 2 | | 40 | | | | | | |
| Resin | Rosin - WW | | | 40 | | | | | |
| | Terpene resin | | | | 40 | | | | Softing point 115° C |
| | Alicyclic resin | | | | | 40 | | | Softing point 115° C |
| | Aliphatic resin | | | | | | 40 | | Softing point 100° C |
| | Aromatic resin | | | | | | | 40 | Softing point 120° C |
| Paraffin wax (64° C) | | 20 | 20 | 20 | 20 | 20 | 20 | 20 | |
| Softening point (° C) | | 74 | 72 | 66 | 67 | 69 | 70 | 74 | |
| Adhesive Strength (g/25mm wide) | aluminum/aluminum | 300 | 450 | 3,750 | 1,150 | 100 | 1,050 | 350 | |
| | polyester/polyester | 10 | 250 | 2,400 | 150 | 100 | 200 | 150 | |
| Low Temperature Characteristics (−10° C) | | broken | broken | not broken | broken | broken | not broken | broken | |
| Color Value | | brown | brown | yellow | light yellow | white | brown | brown | |

The hot melt adhesive compounds prepared in accordance with each of the foregoing Examples and Comparing Examples were tested for their physical qualities hereafter described. The results of such tests are identified in Tables 3 and 4, from which it has now been found that the products of the invention are superior to those obtained in the Comparing Examples in regard to adhesiveness, low temperature characteristics and color.

The tackifying resin employed in accordance with the invention may widely vary in the softening point ranging from 50° to 125° C. However, lower softening points than this range would result in reduced heat-resistance, while higher softening points would lead to poor compatibility and adhesiveness. Preferred softening points of the resin are therefore in the range of 60° - 120° C.

It has also been found that too little ethylene copolymers to be blended with the tackifying resin would result in reduced compatibility and hence poor adhesiveness. The amounts of these ethylene copolymers are therefore preferably in the range of 10 - 60 weight percent, more preferably in the range of 15 - 45 weight percent.

The wax component employed in the compositions of the invention may be either petroleum waxes melting normally in the range of 50° - 93.3° C such as paraffin wax and microcrystalline wax, or natural waxes such as carnauba wax. Low molecular weight waxes byproduced during the manufacture of polyethylene are also suitable for the purpose of the invention.

Product Test
(1) Softening Point (Ring-and-Ball Method).
    The procedure of JIS K-2531 was followed.
(2) Melt Viscosity.
    The Brookfield viscometer was used.
(3) Adhesive Strength.
    (i) Aluminum Substrate.
    The adhesive compound was applied to a pair of aluminum panels and pressed therebetween at 180° C for 3 minutes to form a film 0.2 mm thick and disposed for 24 hours at a temperature of 20 ± 1° C -continued Product Test
and a humidity of 60%. Thereafter, the adhesive film was peeled in T-fashion by a tensile testing machine at a rate of 150 mm per minute.
    (ii) Polyester Substrate.
    The adhesive compound was applied to a polyester film 38 microns thick by an applicator to a thickness of 0.1 mm. and heat-sealed at 120° C for 1.0 second with 2 kg./cm² load. Adhesive strength was tested by the above method (i).
(4) Low Temperature Charactertistics.
    This test was made of a testing piece of adhesive compound measuring 100 mm long, 10 mm wide and 2 mm thick. The piece was bent around a 3 mm mandrel at −10° C with use of the JIS K-5400 flexing machine to see whether or not it breaks.
(5) Color Value.
    The color evaluation of the adhesive compounds was made after they had been solidified, and each sample compound was graded progressively from white, light yellow, yellow, to brown.

What is claimed is:

1. A hot melt adhesive composition which comprises a tackifying resin, an ethylene copolymer and a wax, said tackifying resin resulting from the polymerization of a thermally-cracked petroleum fraction which has a boiling point in the range of 140° - 220° C and in which the content of conjugated diolefin is 0.7 weight percent or less, the ratio of conjugated diolefin content to the polymerizable component is 3 percent or less, the total content of indene and its alkyl derivatives is 2 weight percent or less, and the ratio of indene content to the polymerizable component is 8 percent or less, said polymerization being carried out at a temperature in the range of from −30° C to +60° C in the presence of a Friedel-Crafts catalyst added in amounts of 0.01 - 5 weight percent based on said fraction.

2. A hot melt adhesive composition as claimed in claim 1 wherein said tackifying resin has a softening point in the range of 50° - 125° C.

3. A hot melt adhesive composition as claimed in claim 1 wherein said ethylene copolymer is a copolymer of ethylene and monocarboxylic acid vinylester and/or acrylic acid ester having a melt index of 0.1 - 1,000.

4. A hot melt adhesive composition as claimed in claim 1 wherein the content of said ethylene copolymer is in the range of 10 – 60 weight percent.

5. A hot melt adhesive composition as claimed in claim 1 wherein said wax is selected from the group consisting of paraffin wax, microcrystalline wax, polyethylene wax, polypropylene wax, atactic polypropylene wax and naturally occurring waxes.

6. A hot melt adhesive composition as claimed in claim 1 wherein said tackifying resin and said wax are blended in amounts of 20 – 300 parts and 10 – 400 parts by weight respectively per 100 parts by weight of said ethylene copolymer.

* * * * *